United States Patent
Ochiai

(10) Patent No.: US 8,169,852 B2
(45) Date of Patent: May 1, 2012

(54) MEMORY CONTROL CIRCUIT, CONTROL METHOD, AND STORAGE MEDIUM

(75) Inventor: Wataru Ochiai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 12/774,266

(22) Filed: May 5, 2010

(65) Prior Publication Data

US 2010/0287391 A1     Nov. 11, 2010

(30) Foreign Application Priority Data

May 8, 2009    (JP) ................................. 2009-113837

(51) Int. Cl.
*G11C 8/18*   (2006.01)
(52) U.S. Cl. .................. 365/233.5; 365/227; 365/222
(58) Field of Classification Search .................. 365/227, 365/233.5, 222
See application file for complete search history.

(56) References Cited

U.S. PATENT DOCUMENTS

| | | | | |
|---|---|---|---|---|
| 6,457,095 | B1 * | 9/2002 | Volk | 711/105 |
| 6,563,746 | B2 * | 5/2003 | Fujioka et al. | 365/189.09 |
| 6,892,315 | B1 * | 5/2005 | Williams | 713/502 |
| 2010/0306552 | A1 * | 12/2010 | LeVine et al. | 713/189 |

FOREIGN PATENT DOCUMENTS

JP    10-302460 A    11/1998

* cited by examiner

*Primary Examiner* — Huan Hoang
*Assistant Examiner* — Jay Radke
(74) *Attorney, Agent, or Firm* — Canon U.S.A., Inc. IP Division

(57) ABSTRACT

A circuit configured to change a mode of a plurality of memory devices having a power saving mode includes a command queue configured to hold memory access, and a cancellation unit configured to cancel the power saving mode of target devices of the memory access held up to a predetermined stage of the command queue.

20 Claims, 5 Drawing Sheets

MEMORY CONTROL CIRCUIT, CONTROL METHOD, AND STORAGE MEDIUM

BACKGROUND OF THE INVENTION

1. Field of the Invention

The present invention relates to power saving control of a plurality of dynamic random access memory (DRAM) devices in a memory control circuit that controls the plurality of DRAM devices.

2. Description of the Related Art

Large scale integrations (LSIs) (system-on-chip (SOC)) in recent years are becoming more sophisticated in functionality by mounting an intellectual property (IP) core other than a central processing unit (CPU) on a chip. Moreover, each intellectual property (IP) core attempts to perform data processing in parallel and thus a memory device mounted on a substrate needs to be a fast and large-capacity device. To meet such requirements, a synchronous dynamic random access memory (SDRAM) device is nowadays used as a memory device, but a plurality of fast memory devices such as double-data-rate (DDR)-SDRAM and DDR2-SDRAM (DDR3, DDR4) is used for still faster access.

In such a system, particularly a system based on a battery operation, it is becoming increasingly difficult not to consider power consumption as an entire system so that a reduction in power consumption of, particularly, a DRAM is becoming an important challenge due to the use of many DRAMs.

A technique discussed in Japanese Patent Application Laid-Open No. 10-302460 is known as a solution thereof. According to the technique, power consumption can be reduced by putting the DRAM into a self-refresh mode.

FIG. 4 illustrates the configuration of a conventional memory control circuit. In FIG. 4, a memory control circuit 200 includes a register 201 to provide instructions to put a DRAM (not illustrated) into self-refresh, an access receiving circuit 202 that receives memory access from an external module such as a direct memory access controller (DMAC) (not illustrated), and a command issuing circuit 203 that issues a command to the DRAM in response to a request from the register 201 or the access receiving circuit 202.

FIG. 5 is a timing chart illustrating an operation of the memory control circuit 200 illustrated in FIG. 4, and a case where a DRAM is set from a normal mode to a power saving mode and, then, the power saving mode is canceled to cause the DRAM to perform access will be described with reference to FIG. 5.

The access receiving circuit 202 receives memory access from the DMAC and asserts an access request signal "access" for the command issuing circuit 203 in a normal mode (t2). The command issuing circuit 203 issues a read or write command to the DRAM according to assertion of the signal "access" (t3). The CPU writes "1" into the register 201 and the register 201 asserts a transition request signal "lowp" to the power saving mode to change the mode from the normal mode to the power saving mode (t5). The command issuing circuit 203 issues a command of power saving mode transition to the DRAM according to assertion of the signal "lowp" (t6). The access receiving circuit 202 receives memory access from the DMAC and asserts the access request signal "access" for the command issuing circuit 203 (t9). The register 201 deasserts the signal "lowp" according to assertion of the signal "access" (t10). The command issuing circuit 203 issues a command to cancel the self-refresh to the DRAM according to deassertion of the signal "lowp" (t10). The command issuing circuit 203 holds the assertion of the signal "access" asserted at time t9 and issues a read or write command to the DRAM after waiting until it becomes possible to issue a command after the cancellation of the self-refresh (t13).

The power saving mode is canceled in a conventional memory control circuit according to access by an external DMAC or the like. Thus, if the memory control circuit has a command queue that temporarily holds a plurality of pieces of access, when access to a memory device in the power saving mode is entered in the command queue, the power saving mode of the device to be accessed is canceled. Therefore, power is consumed in a period after the cancellation of the power saving mode until it becomes possible to issue the access even if the memory device can be maintained in the power saving mode, so that the timing of canceling the power saving mode is not optimized.

SUMMARY OF THE INVENTION

According to an exemplary embodiment of the present invention, a circuit configured to change a mode of a plurality of memory devices having a power saving mode includes a command queue configured to hold memory access; and a cancellation unit configured to cancel the power saving mode of target devices of the memory access held up to a predetermined stage of the command queue.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
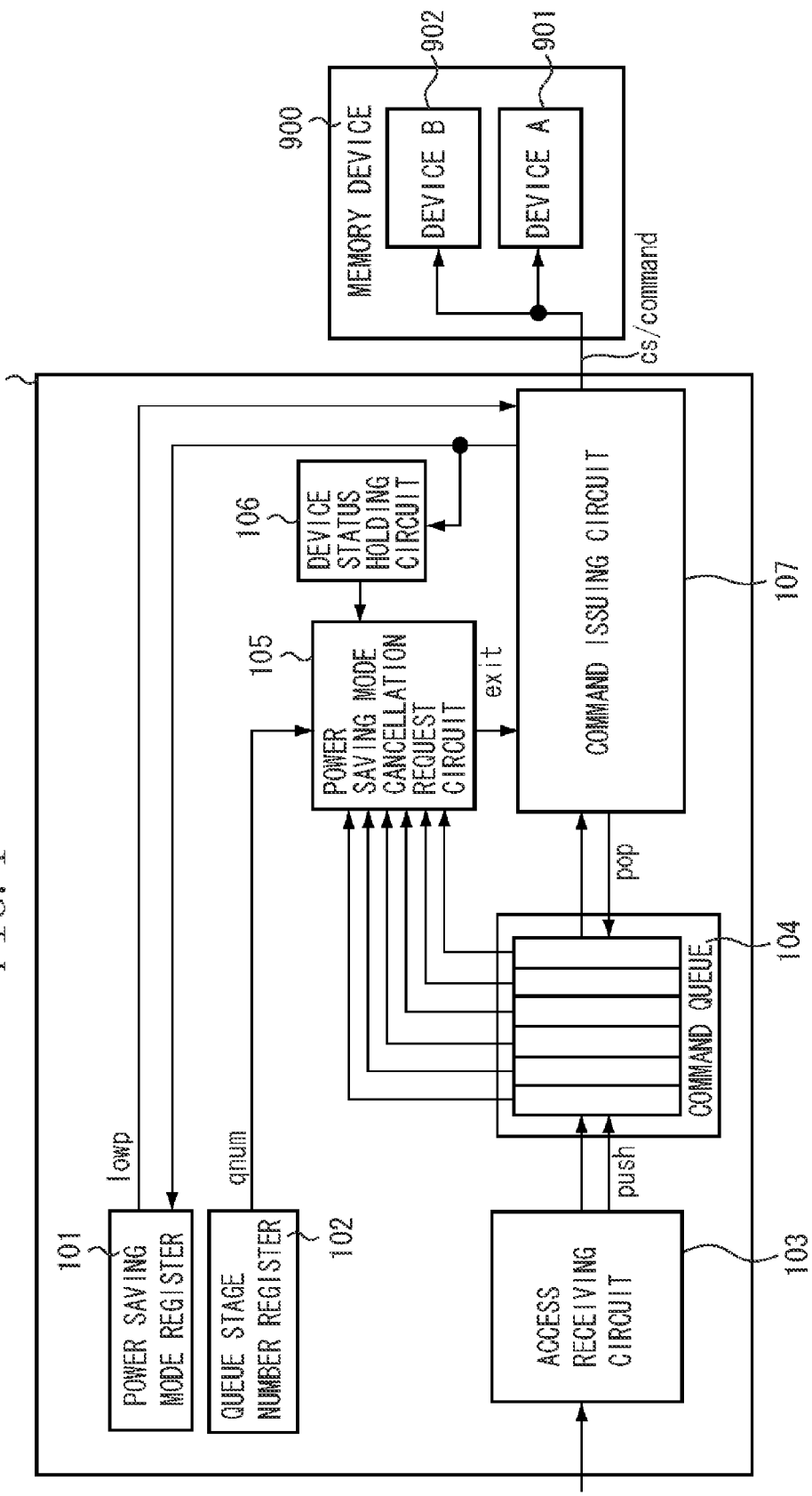
FIG. 1 is a block diagram illustrating the configuration of a memory control circuit according to an exemplary embodiment of the present invention.

FIG. 1 illustrates the configuration of a memory control circuit according to an exemplary embodiment of the present invention. In FIG. 1, a memory control circuit 100 includes a power saving mode register 101 to provide instructions to cause each memory device to make a transition to the power saving mode, a queue stage number register 102 to set up to which stage of a command queue described below an address check should be made, an access receiving circuit 103 that receives memory access (command) by an external module such as a DMAC (not illustrated), a command queue 104 that holds up to M pieces of access (command) received by the access receiving circuit 103, and a power saving mode cancellation request circuit 105 that determines whether access target devices of access held in the predetermined number of stages (N) set by the queue stage number register 102 are in a power saving mode and, if an access target device is in the power saving mode, requests power saving mode cancellation of the memory device.

The value of the number of stages N held by the queue stage number register 102 can be changed from outside. The memory control circuit 100 further includes a device status holding circuit 106 that holds the state (in which operation mode) of each memory device, and a command issuing circuit 107 that, when access is entered in the command queue 104, issues access entered at the head of the command queue 104 to a memory device. The command issuing circuit 107 cancels, after receiving a power saving mode cancellation request of a memory device specified by the power saving mode cancellation request circuit 105, the power saving mode of the memory device. Also, after receiving a power saving mode transition request of a memory device from the power saving mode register 101, the command issuing circuit 107 causes the memory device to make a transition to the power saving mode. A memory 900 is accessed by the memory control circuit 100 and includes two memory devices 901 and 902.

Figure 2:
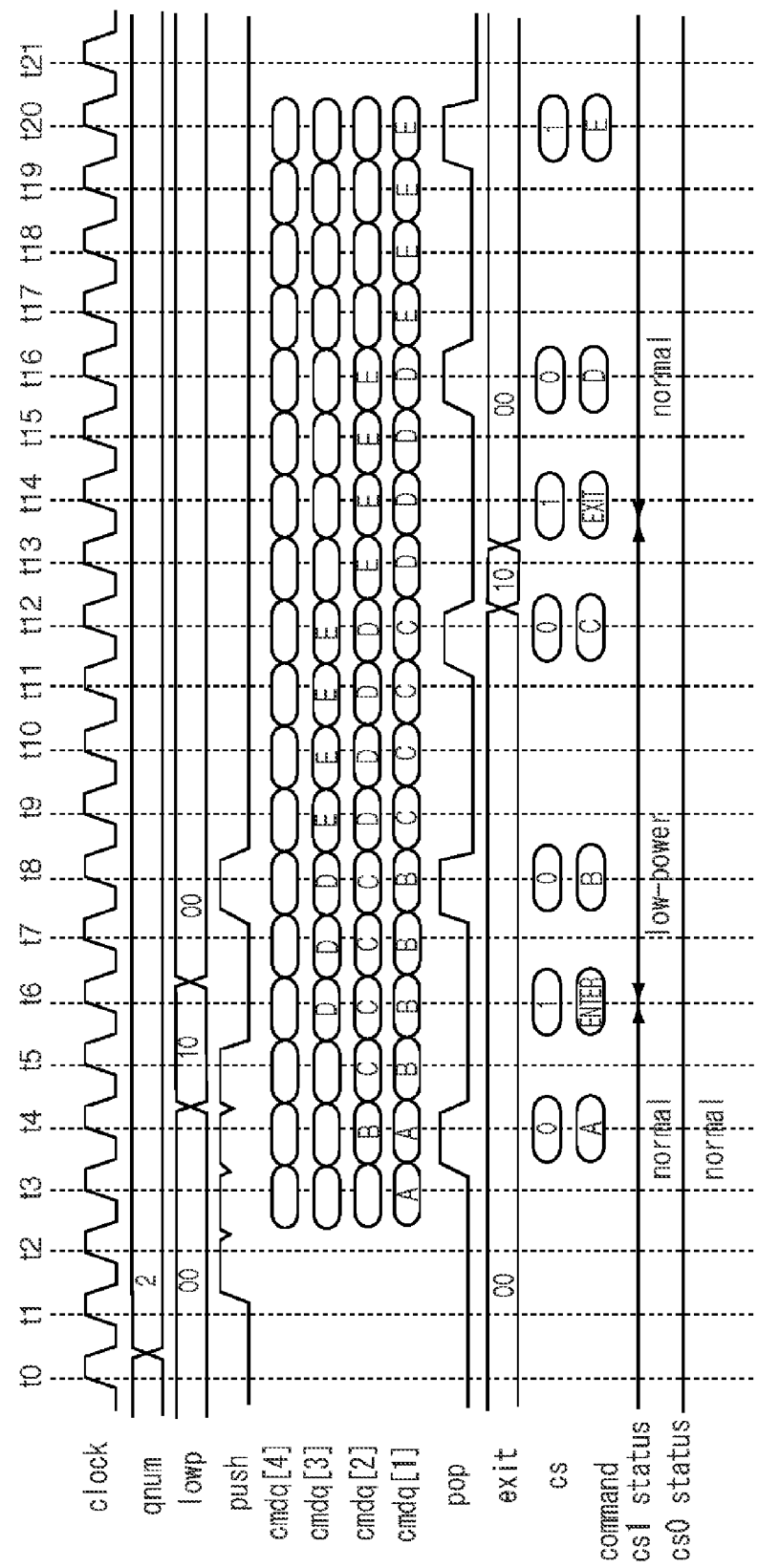
FIG. 2 is a timing chart illustrating an operation state of the memory control circuit.

FIG. 2 is a timing chart illustrating the operation of the memory control circuit 100 illustrated in FIG. 1.

The operation when only the memory device 902 is set from the normal mode to the power saving mode and further the power saving mode of the memory device 902 is canceled to perform access will be described with reference to FIG. 2.

The access receiving circuit 103 receives write access to the memory device 901 from the DMAC and asserts a signal "push" for the command queue 104 (t2, t3, t4, t5, and t8). The command queue 104 queues up to M pieces of the access according to assertion of the signal "push" (t2, t3, t4, t5, and t8). It is assumed that access A, B, C, and D entered in the command queue 104 is intended for the memory device 901 and access E for the memory device 902. The command issuing circuit 107 fetches the access entered at the head of the command queue 104 by asserting a signal "pop" and issues a read or write command to the memory device (t4, t8, t12, t16, and t20). The command issuing circuit 107 asserts a signal "cs" indicating for which memory device access is intended simultaneously with a command signal. The signal "cs" being "0" indicates that the command is intended for the memory device 901 and the signal "cs" being "1" indicates that the command is intended for the memory device 902.

An external module such as a CPU (not illustrated) makes a setting to the power saving mode register 101 as to which memory device should be caused to make a transition to the power saving mode by (t5). It is assumed here that the power saving mode register 101 is a 2-bit register in line with the number of memory devices. It is also assumed that the lower-order bit becomes a power saving mode transition request for the memory device 901 and the higher-order bit becomes a power saving mode transition request for the memory device 902 so that the memory device corresponding to the bit set to "1" makes a transition to the power saving mode. In FIG. 2, the power saving mode register 101 is set to "10" so that the memory device 902 makes a transition to the power saving mode. The power saving mode register 101 outputs a value set thereto as a signal "lowp". The command issuing circuit 107 determines which memory device should be caused to make a transition to the power saving mode according to the value of the signal "lowp" and causes the applicable memory device to change to the power saving mode. Here, the command issuing circuit 107 causes the memory device 902 to make a transition to the power saving mode (t6). At this point, the command issuing circuit 107 notifies the device status holding circuit 106 that the memory device 902 has been caused to make a transition to the power saving mode. The device status holding circuit 106 holds information about which of the normal mode and the power saving mode each memory device is in. The command issuing circuit 107 also notifies the power saving mode register 101 that the memory device 902 has been caused to make a transition to the power saving mode, and the power saving mode register 101 clears the power saving mode transition request (t7). Even if the memory device 902 is in the power saving mode, the other memory device 901 is accessed (t8 and t12).

An external module such as a CPU sets "2" to the queue stage number register 102. The set value is output as a signal "qnum". The power saving mode cancellation request circuit 105 determines whether access held between the first and second stages of the command queue 104 is access to a memory device in the power saving mode depending on the value of the signal "qnum". If the access is to a memory device in the power saving mode, the power saving mode cancellation request circuit 105 asserts a cancellation request signal "exit" (t13). Here, if the access is to the memory device 902, the power saving mode cancellation request circuit 105 sets the signal "exit" as "10". Like the signal "lowp", it is assumed that each bit of the signal "exit" corresponds to each device. The command issuing circuit 107 issues a command to cancel the power saving mode of the memory device 902 according to assertion of the signal "exit" (t14).

Here, the value set to the queue stage number register 102 is calculated by "minimum access issuance interval× N">"number of wait cycles after power saving mode cancellation". Assume, for example, that access entered in the command queue 104 is issued to a memory device once in four cycles in the case of minimum access. It is also assumed that the memory device is specified to have six cycles after the cancellation of the power saving mode before it becomes possible to issue a next command. Applying these values to the above condition yields N≧2. By canceling the power saving mode while access is in the N-th stage of the command queue or higher, access can be issued without degradation in memory access performance (t20). Moreover, a memory device can be maintained in the power saving mode as long as possible by setting N to the minimum value (t10, t11, t12, and t13).

Figure 3:
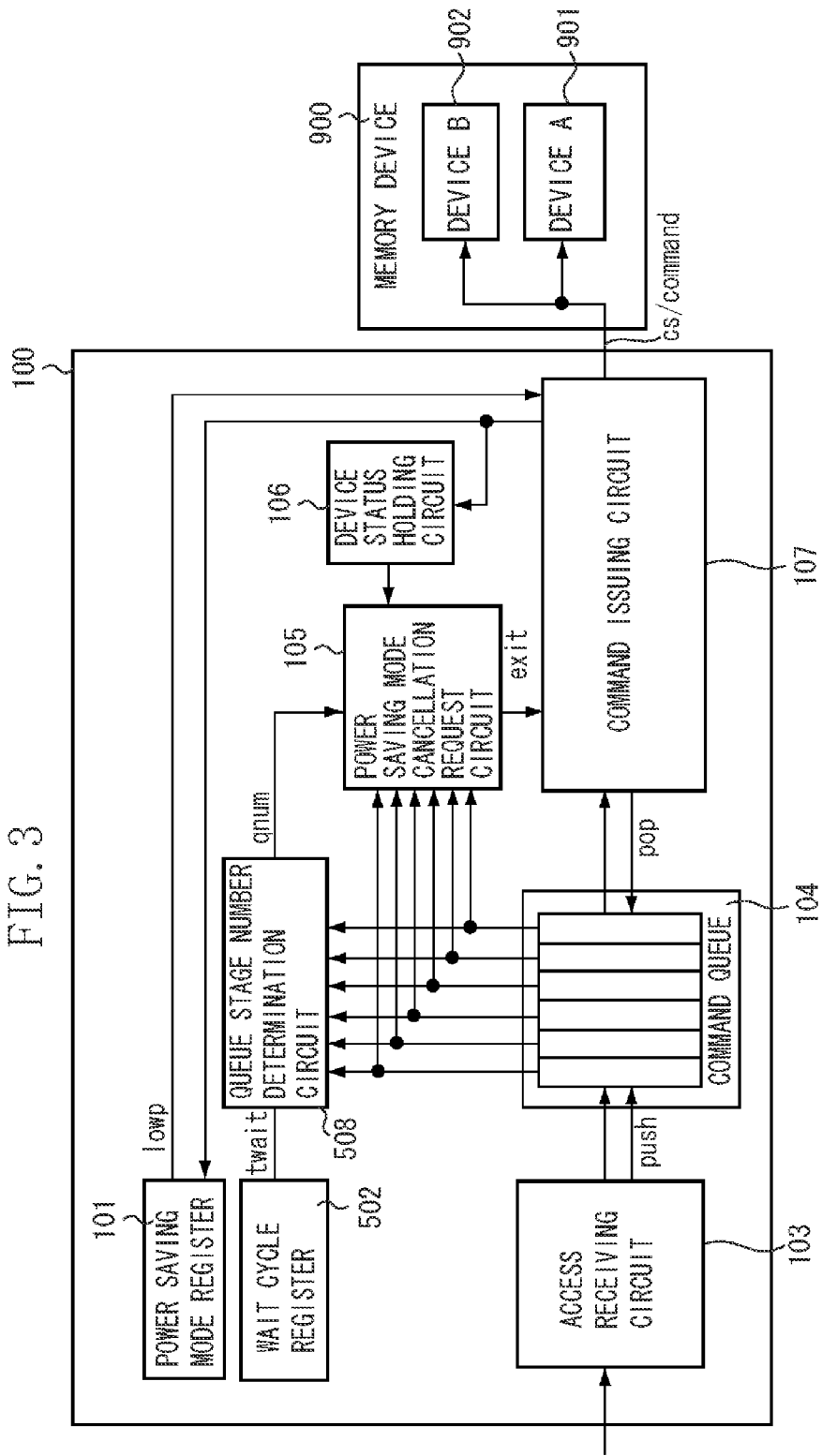
FIG. 3 is a block diagram illustrating a modification of the configuration of the memory control circuit.
Figure 4:
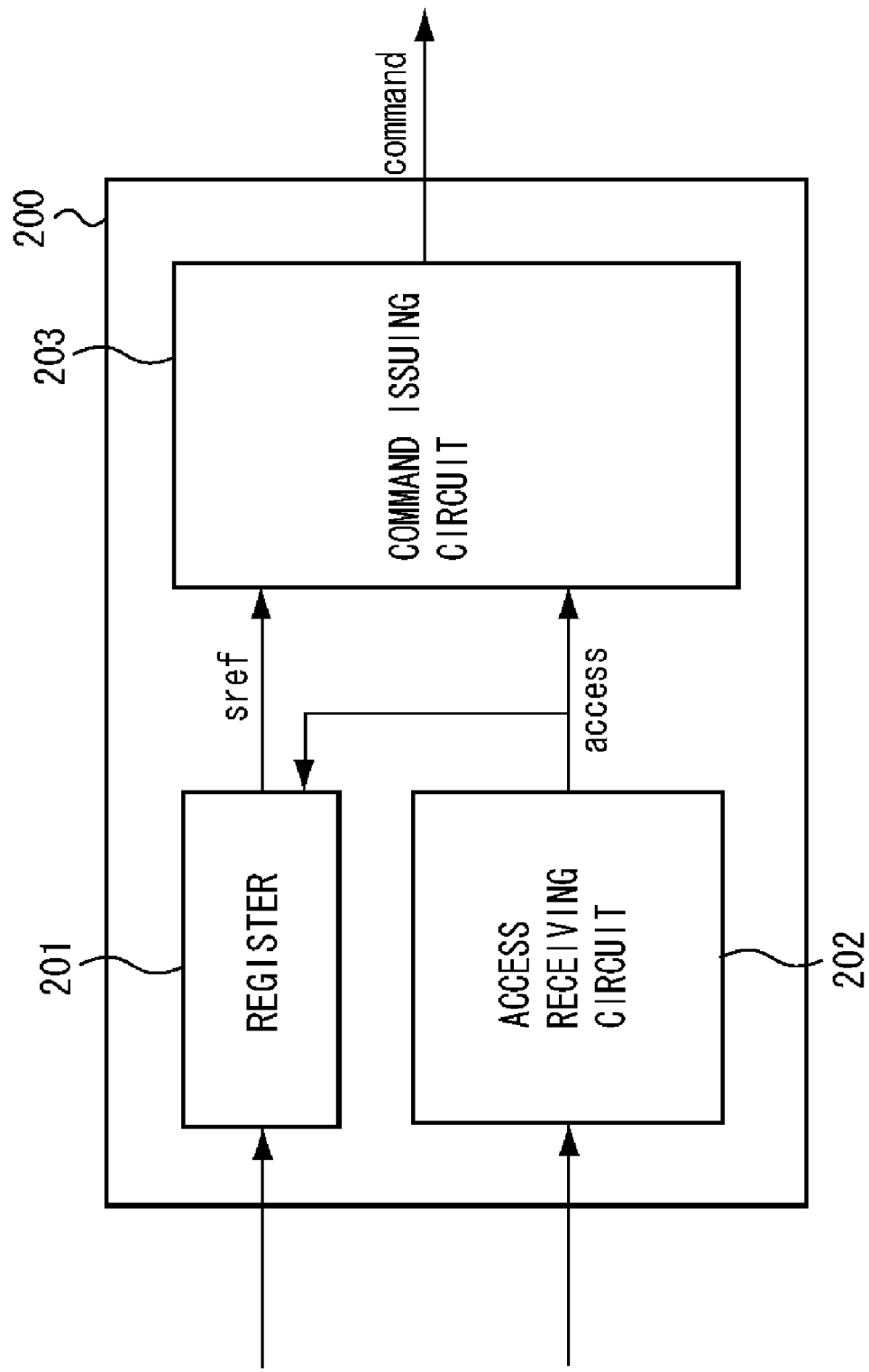
FIG. 4 is a block diagram illustrating the configuration of a conventional memory control circuit.
Figure 5:
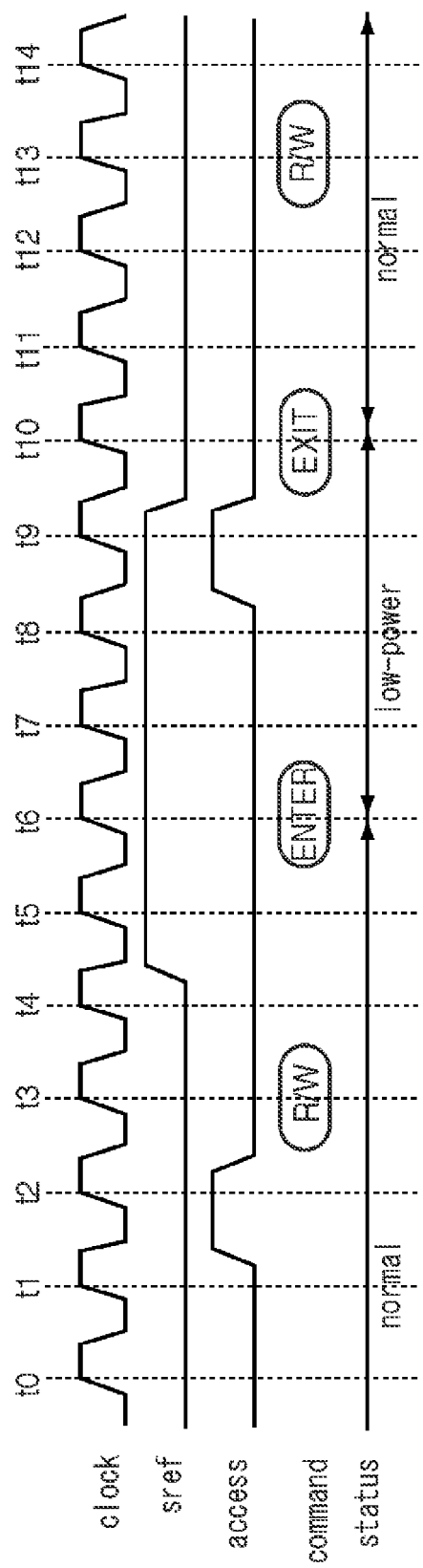
FIG. 5 is a timing chart illustrating the operation state of the conventional memory control circuit.

The number N of stages of the command queue is set to the queue stage number register 102 in FIG. 1, but as illustrated in FIG. 3, the number N of queue stages may be determined by a queue stage number determination circuit 508 after only wait cycles after the cancellation of the power saving mode are set to a wait cycle register 502. The queue stage number determination circuit 508 determines the number N of queue stages by "total access time up to the N-th stage">"number of wait cycles after power saving mode cancellation" according to the time necessary for access of each time from the command queue 104 and the number of wait cycles.

A burst length at the time of accessing a memory device is determined in a DRAM device and if access queued in the command queue 104 is a memory access unit of single access, the time necessary for access of each time can uniquely be determined.

If, for example, single memory access needs four cycles, the time necessary for access of each time becomes four cycles. If the number of wait cycles after the cancellation of the power saving mode is 6, the above condition yields 4×N>6, leading to N≧2 to satisfy the above condition.

If access queued in the command queue 104 may be divided into a plurality of times of memory access, the time necessary for access of each time can be determined based on the number of times of division.

The value of N by which the total ranging from the time necessary for access in the first stage to that necessary for access in the N-th stage exceeds the number of wait cycles after the cancellation of the power saving mode is determined by also queuing information about the number of times of division of access of each time in the command queue 104 at the same time.

Assume, for example, that access to the first stage needs a time for single memory access, access to the second stage for double memory access, access to the third stage for single memory access, and access to the fourth stage for double memory access. If single memory access needs four cycles and the number of wait cycles after the cancellation of the power saving mode is 14, $4\times1+4\times2+4\times1>14$ holds so that the above condition is satisfied by $N\geq3$.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-113837 filed May 8, 2009, which is hereby incorporated by reference herein in its entirety.

What is claimed is:

1. A circuit configured to change a mode of a plurality of memory devices having a power saving mode, the circuit comprising:
  a command queue configured to hold memory access; and
  a cancellation unit configured to cancel the power saving mode of target devices of the memory access held up to a predetermined stage of the command queue.

2. The circuit according to claim 1, wherein a time necessary for access to the access up to the predetermined stage does not exceed a time required until it becomes possible to issue next access for a memory device whose power saving mode is canceled.

3. The circuit according to claim 1, wherein the predetermined stage of the command queue can be set from outside.

4. The circuit according to claim 1, further comprising:
  a setting unit configured to set a time required until it becomes possible to issue access after a cancellation of the power saving mode to the memory device; and
  a calculation unit configured to calculate the set time and a time necessary to issue the access held in the command queue,
  wherein the cancellation unit determines the predetermined stage of the command queue to cancel the power saving mode.

5. The circuit according to claim 1, wherein the memory device is a DRAM device.

6. The circuit according to claim 1, wherein the power saving mode is a self-refresh mode of a DRAM device.

7. The circuit according to claim 1, wherein the command queue is configured to hold up to M pieces of the memory access.

8. The circuit according to claim 1, wherein the cancellation unit is configured to cancel the power saving mode of target devices and the command queue is configured to hold up to M pieces of the memory access.

9. A method for changing a mode of a plurality of memory devices having a power saving mode, the method comprising:
  holding memory access in a command queue; and
  canceling the power saving mode of target devices of the memory access held up to a predetermined stage of the command queue.

10. The method according to claim 9, wherein a time necessary for access to the access up to the predetermined stage does not exceed a time required until it becomes possible to issue next access for a memory device whose power saving mode is canceled.

11. The method according to claim 9, further comprising setting the predetermined stage of the command queue outside.

12. The method according to claim 9, further comprising:
  setting a time required until it becomes possible to issue access after a cancellation of the power saving mode to a memory device; and
  calculating the set time and a time necessary to issue the access held in the command queue,
  determining the predetermined stage of the command queue to cancel the power saving mode.

13. The method according to claim 9, further comprising holding up to M pieces of the memory access.

14. The method according to claim 9, further comprising canceling the power saving mode of target devices and holding up to M pieces of the memory access.

15. A computer-readable storage medium storing a program for causing a memory control circuit configured to change a mode of a plurality of memory devices having a power saving mode to operate, the program comprising:
  holding memory access in a command queue; and
  canceling the power saving mode of target devices of the memory access held up to a predetermined stage of the command queue.

16. The computer-readable storage medium according to claim 15, wherein a time necessary for access to the access up to the predetermined stage does not exceed a time required until it becomes possible to issue next access for a memory device whose power saving mode is canceled.

17. The computer-readable storage medium according to claim 15, further comprising setting the predetermined stage of the command queue outside.

18. The computer-readable storage medium according to claim 15, further comprising:
  setting a time required until it becomes possible to issue access after a cancellation of the power saving mode to a memory device; and
  calculating the set time and a time necessary to issue the access held in the command queue,
  determining the predetermined stage of the command queue to cancel the power saving mode.

19. The computer-readable storage medium according to claim 15, further comprising holding up to M pieces of the memory access.

20. The computer-readable storage medium according to claim 15, further comprising canceling the power saving mode of target devices and holding up to M pieces of the memory access.

* * * * *